(12) United States Patent
Williams et al.

(10) Patent No.: US 6,729,827 B1
(45) Date of Patent: May 4, 2004

(54) UNIVERSAL WHEELCHAIR LIFT AND RESTRAINT SYSTEM

(75) Inventors: Chad Williams, Sarasota, FL (US); Jeff Duval, Sarasota, FL (US)

(73) Assignee: Chadco Enterprises, Inc., Sarasota, FL (US)

( * ) Notice: Subject to any disclaimer, the term of this patent is extended or adjusted under 35 U.S.C. 154(b) by 36 days.

(21) Appl. No.: 10/091,720

(22) Filed: Mar. 6, 2002

(51) Int. Cl.7 .................................................. B60P 3/00
(52) U.S. Cl. ............................ 414/462; 410/7; 410/100
(58) Field of Search ............................. 414/462; 410/3, 410/4, 7, 11, 12, 13, 100, 103

(56) References Cited

U.S. PATENT DOCUMENTS

| | | | | |
|---|---|---|---|---|
| 1,973,624 A | * | 9/1934 | Hanlon ........................ | 414/103 |
| 4,775,282 A | * | 10/1988 | Van Vliet .................... | 414/462 |
| 4,842,458 A | * | 6/1989 | Carpenter ..................... | 410/3 |
| 5,391,030 A | * | 2/1995 | Lee .............................. | 410/4 |
| 6,139,247 A | * | 10/2000 | Wright ........................ | 414/462 |

* cited by examiner

*Primary Examiner*—Donald W. Underwood
(74) *Attorney, Agent, or Firm*—Charles J. Prescott

(57) ABSTRACT

A universal power wheelchair lift and restraint system for attachment to a rear of a vehicle. The system includes a lift platform having a substantially flat, uninterrupted generally rectangular support surface sized in length and width to be similar to, and to supportively receive, a broad size and configuration range of power wheelchairs thereon. A power lift mechanism is attachable to the rear of the vehicle and supportively connected to the platform for elevating and lowering the platform with the power wheelchair positioned thereatop. A locking tiedown mechanism is pivotally connected in proximity to each corner of the platform and in proximity to each of the corner areas of the power wheelchair atop the platform. Each tiedown includes an elongated flexible strap extendable from a rolled configuration and having an attaching member securely disposed at a distal end thereof. An attachment connected to each side of the power wheelchair is configured to be securely connectable with the attaching member of each of the tiedowns on each corresponding side of the power wheelchair whereby, when said straps are evenly tensioned and automatically locked, the power wheelchair is immobilized atop said platform.

2 Claims, 5 Drawing Sheets

UNIVERSAL WHEELCHAIR LIFT AND RESTRAINT SYSTEM

BACKGROUND OF THE INVENTION

1. Scope of Invention

This invention relates generally to equipment and accessories for the physically challenged, and more particularly to a universal power wheelchair lift and restraint system attachable to the rear of a vehicle.

2. Prior Art

The use of battery operated power wheelchairs by the physically challenged is widespread. These wheelchairs are available in a wide range of sizes and shapes and typically include spaced apart drive wheels positioned centrally fore and aft with respect to the length of the wheelchair and front and/or back spaced wheels utilized to support and properly balance the user of the chair.

The use of power wheelchairs has extended beyond the immediate home or living quarters so that the physically challenged person may transport the power wheelchair to other locations such as to shopping centers, visits, vacations and the like. Smaller power chairs such as the motorized trike are intended to be dismantled either by the physically challenged person or an attendant and then stored in the trunk or back of a vehicle because of their light weight and compact size. However, the larger power wheelchairs are far too massive to be easily lifted and stored into a trunk and must be driven into a suitably converted van by powering it up a side or rear attached ramp or by loading it onto a lift platform which then allows the user to drive the power wheelchair into the modified interior of the van.

As an alternate to the above, motorized lift platforms which are attachable to the rear frame structure of a vehicle are also well known. These platforms are sized in length and width to be just slightly larger than the plan dimensions of a power wheelchair so that it may be driven onto the generally rectangular platform when it is lowered to the ground. Thereafter, the power mechanism will lift the platform with the power wheelchair thereatop for transport. When the platform is not in use, it is typically tiltable into an upright position for compact storage.

Obviously, it is of utmost importance to fully secure the power wheelchair atop the platform when the vehicle is driven. One popular means of accomplishing at least a portion of the power wheelchair securement is to provide cavities formed into the surface of the platform to receive at least the larger drive wheels of the power wheelchair. Only nominal hold-down restraints are then required to maintain the drive wheels in the cavities provided in the platform.

However, the universality of such platforms is unavailable because of the broad variety of power wheelchairs and the wheel size, location and spacing thereof. Therefore, short of customizing each support platform for each particular power wheelchair, the tiedown and securement aspect for power wheelchairs atop such carrying platforms is heretofore been unavailable.

The present invention provides a universal power wheelchair lift and restraint system which utilizes a substantially flat preferably rectangular support platform which has a smooth or continuous uninterrupted upper surface onto which virtually all power wheelchairs may be driven when the platform is in the lowered position atop the ground. The tiedown restraint for the power wheelchair is accomplished by four separate tiedown mechanisms which are pivotally connected in proximity to each of the corners of the platform and corresponding corners of the power wheelchair. Each of the tiedown mechanisms include an elongated flexible strap which is held in a rolled position when not in use and which includes a hook or snap attaching member connected to the distal end of the strap. By attachment of each of the attaching members to a central location on either side of the power wheelchair in strap pairs, a four point securement of the power wheelchair atop the platform is achieved.

BRIEF SUMMARY OF THE INVENTION

This invention is directed to a universal power wheelchair lift and restraint system for attachment to a rear of a vehicle. The system includes a lift platform having a substantially flat, uninterrupted generally rectangular support surface sized in length and width to be similar to, and to supportively receive, a broad size and configuration range of power wheelchair thereon. A power lift mechanism is attachable to the rear of the vehicle and supportively connected to the platform for elevating and lowering the platform with the power wheelchair positioned thereatop. A locking tiedown mechanism is pivotally connected in proximity to each corner of the platform and in proximity to each of the corner areas of the power wheelchair atop the platform. Each tiedown includes an elongated flexible strap extendable from a rolled configuration and having an attaching member securely disposed at a distal end thereof. An attachment connected to each side of the power wheelchair is configured to be securely connectable with the attaching member of each of the tiedowns on each corresponding side of the power wheelchair whereby, when said straps are evenly tensioned and automatically locked, the power wheelchair is immobilized atop said platform.

It is therefore an object of this invention to provide a universal power wheelchair lift and restraint system which will accommodate the secure transport of virtually all sizes, shapes and drive and support wheel arrangements of any power wheelchair in use by the physically challenged.

It is another object of this invention to utilize a well known tiedown mechanism to restrain a power wheelchair atop a transport platform attached to the rear of the vehicle.

In accordance with these and other objects which will become apparent hereinafter, the instant invention will now be described with reference to the accompanying drawings.

DETAILED DESCRIPTION OF THE INVENTION

Figure 1:
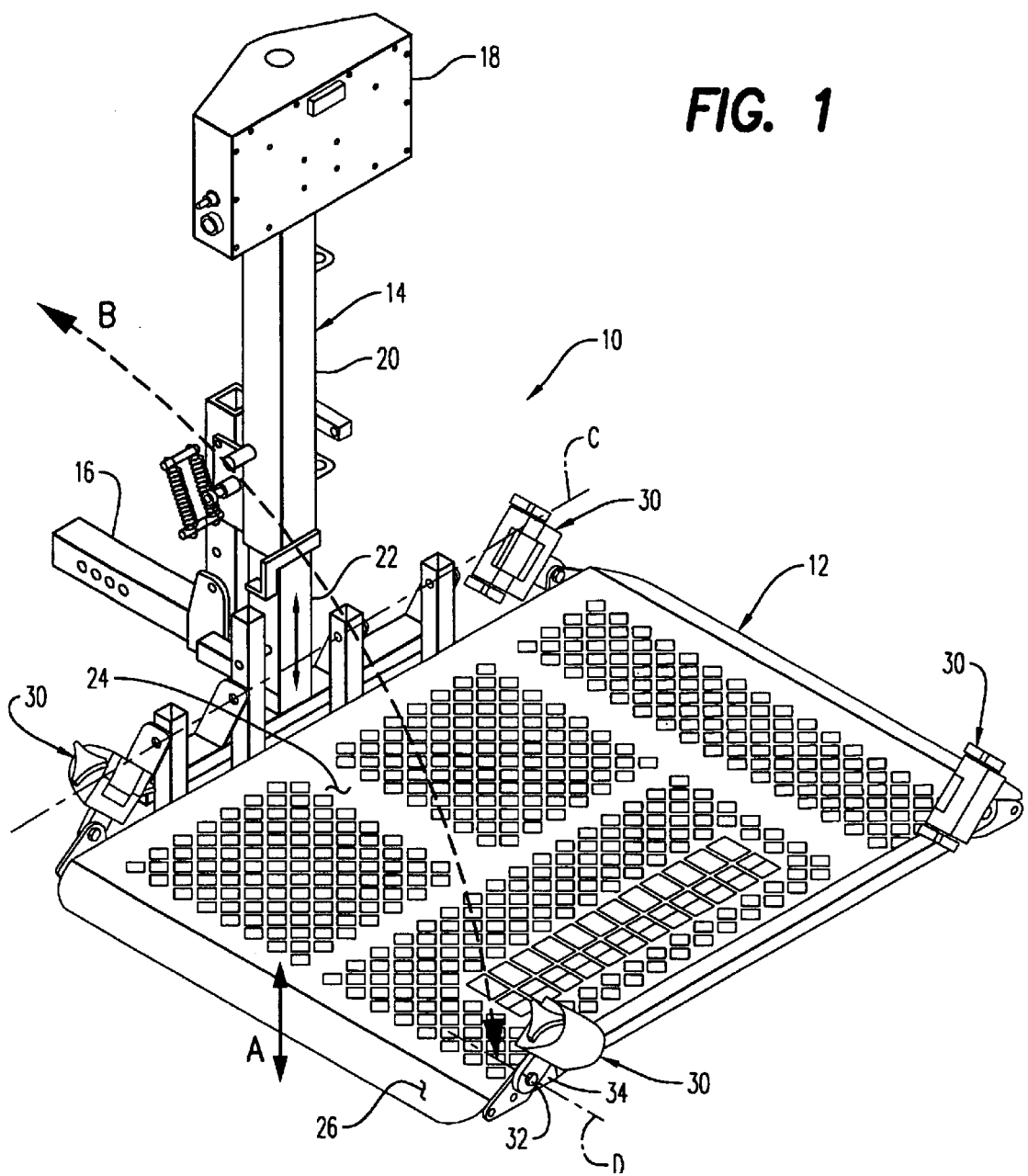
FIG. 1 is a perspective view of the invention in a deployed position showing the platform in the horizontal in-use position.

Referring now to the drawings, and particularly to FIGS. 1, 2, 3 and 7, the invention is there shown generally at numeral 10 and includes a platform assembly 12 which is operably connected to an upright power lift mechanism 14. The lift mechanism 14 includes vehicle engagement structure including a tongue 16 which will operably connect to a frame-mounted trailer hitch arrangement (not shown). The power drive mechanism 18 is operably connected to a source of d.c. battery power from the vehicle's engine compartment (not shown). A lower upright tubular member 22 is movable by the power head 18 within upper tube 20 whereby the platform 12 will move vertically in the direction of arrow A from a position atop the ground to an elevated position sufficiently high to drive the vehicle (not shown).

In addition to the platform 12 being movable vertically in the direction of arrow A on a powered basis, the platform 12 will also pivotally fold into an upright orientation in close proximity to the back of the vehicle and against the power head 18 by manually pivoting the platform 12 about a transverse axis C in the direction of arrow B. When the platform 12 is atop the ground, an apron 26 is provided for ease in the loading of a power wheelchair shown generally at PC in FIG. 2. Note that the upper horizontal surface 24 of the platform 12 is substantially flat and uninterrupted except for the traction texturing shown thereon. Alleviating the need for any cavities or protrusions in or on the upper horizontal surface 24 for restraining the power wheelchair is a major benefit which contributes to the universal aspect of this invention.

Figure 7:
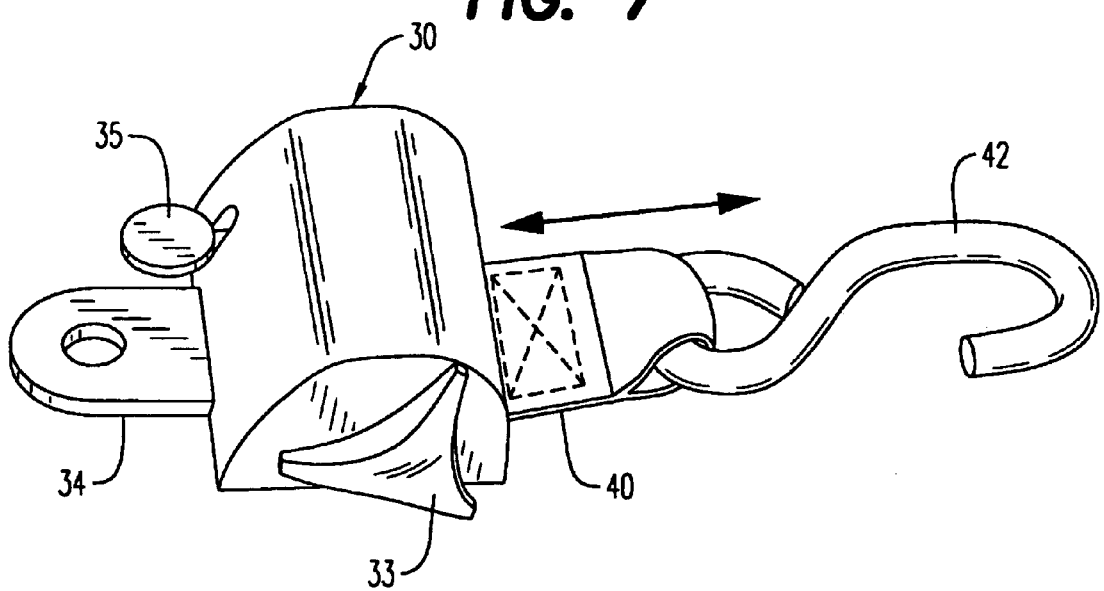
FIG. 7 is a perspective view of the locking tiedown mechanism incorporated into the present invention as shown in FIGS. 1 and 2.

A locking tiedown mechanism generally as shown at 30 and as best seen in FIG. 7, is pivotally connected to each corner of the four corners of the generally rectangular platform 12 by a threaded fastener 32 about a horizontal axis D which runs longitudinal to the vehicle. The locking tiedown mechanism 30 includes an elongated flexible strap 40 which is held in a roll within a housing of the tiedown mechanism 30 and is extendable and retractable in the direction of the arrow. The attachment tab 34 includes a central aperture for receiving the threaded fastener 32 which effects the pivotal connection therebetween.

Figure 2:
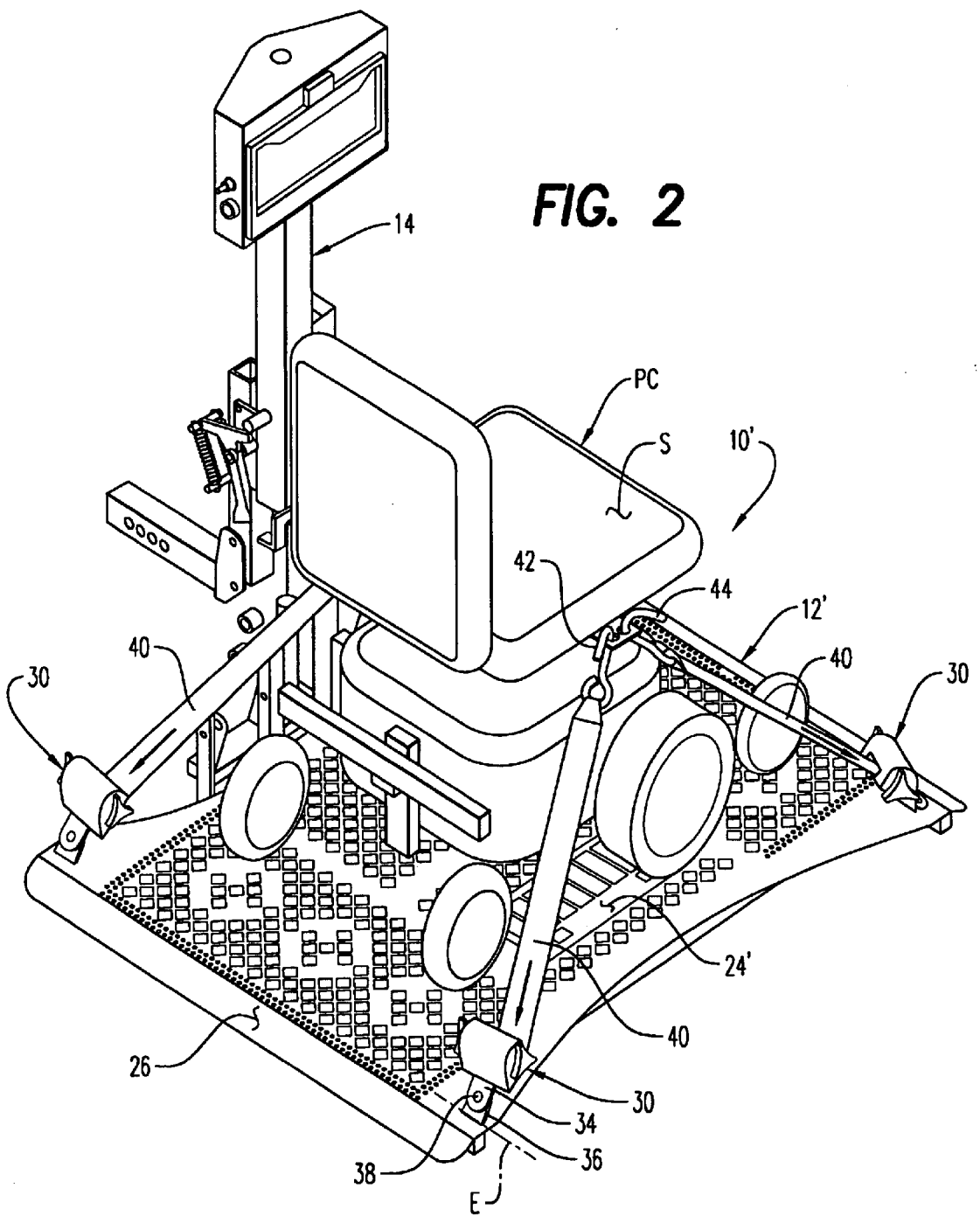
FIG. 2 is a perspective view of FIG. 1 showing a power wheelchair supportively positioned atop an alternate platform and restrained in accordance with the present invention.

Note in FIG. 2 a modified version of the platform 12' is there shown which utilizes a pivotal hinge arrangement 36 with the attachment tab 34 attached to the movable or pivotable half of the hinge by fastener 38. Thus, pivotal movement is about a pivotal axis E which is longitudinal to the vehicle (not shown).

The distal end of the strap 40 includes an attaching member 42 which is typically in the form of an elongated "S". When the attaching member 42 is extended and then retracted, even slightly, an internal locking mechanism then prevents the flexible strap 40 from any further extension until the release lever 35 is depressed. To assist in tensioning the strap 40, a rotatable tensioning wheel 33 is also provided. This tiedown mechanism is available under the trademark "Q-STRAINT", Model QRT, available from Q-Straint of Ft. Lauderdale, Fla.

Figure 3:
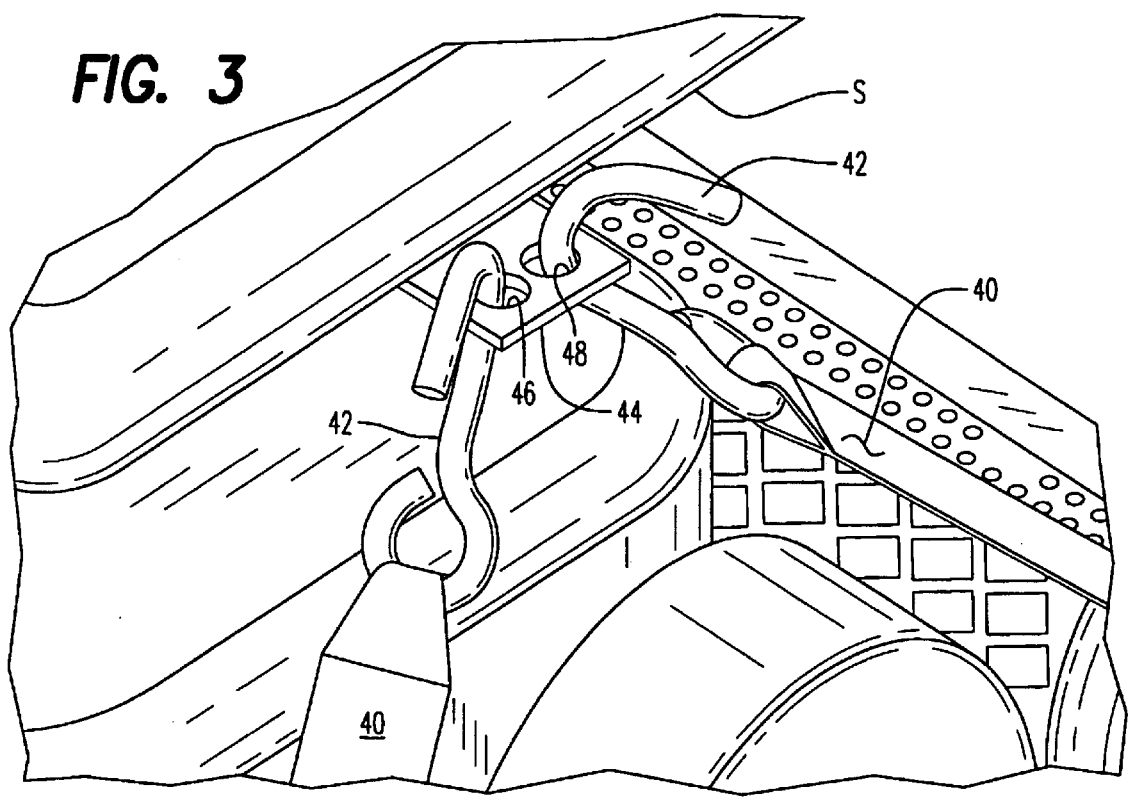
FIG. 3 is an enlarged view of a central portion of FIG. 2.

As best seen in FIG. 3, an attaching plate 44, which is connected beneath seat S of the power wheelchair PC, includes two closely spaced apertures 46 and 48 into which each of the attaching members 42 are engageable as shown. As best seen in FIG. 2, the positioning of the attaching plate 44 is at a central point along the overall length of the power wheelchair PC and just below and along side a side margin of the seat S. After both of the straps 40 on each side of the platform 12 or 12' are extended and the attaching members 42 fitted through the corresponding apertures 46 and 48, the slack is taken up in the flexible strap 40 and then tightened with the tensioning knob 33 to establish a balanced force in each of the flexible straps 40 from all four corners of the platform 12.

By this arrangement, the power wheelchair PC may be pushed or motored onto the platform 12 or 12' when it rests in its lower position atop the ground, after which the power lift mechanism 14 will raise the platform 12 or 12' into a transport position well above the ground in the range of approximately twelve inches depending upon vehicle height. By equally tensioning the four straps 40, which tensioning amount is automatically locked by the tiedown mechanism 30 as previously described, the power wheelchair PC is fully restrained and immobilized atop the platform 12 or 12' without the need for any indents, cavities or protrusions formed into the upper surface 24.

Figure 4:
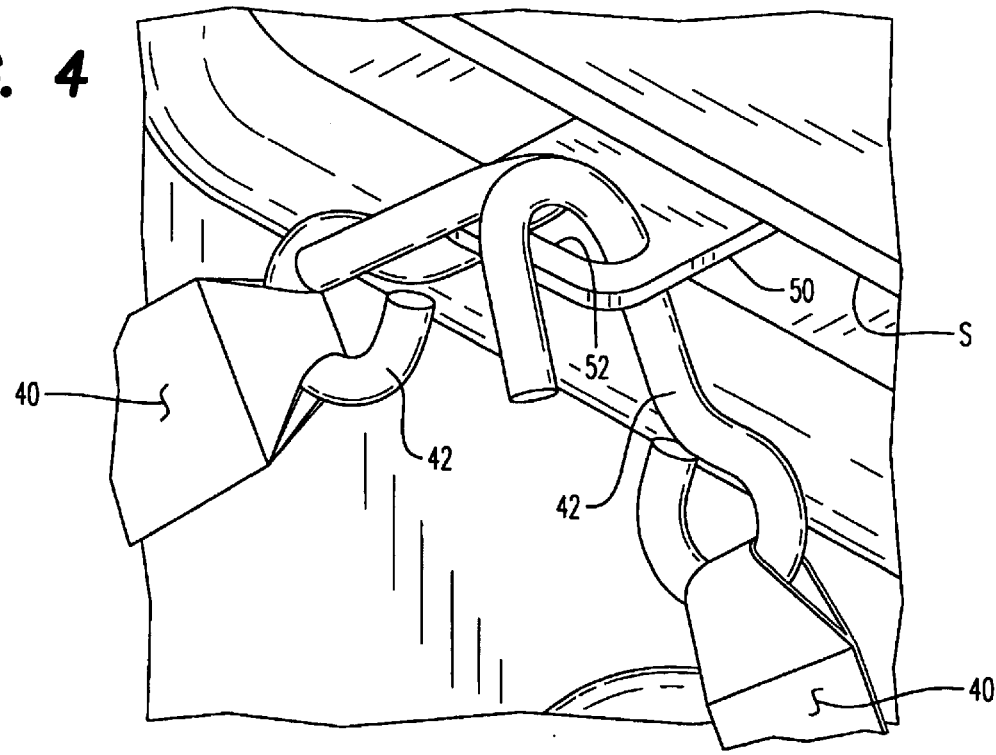
FIG. 4 is an enlarged view similar to that of FIG. 3 depicting an alternate embodiment of the power chair attachment.
Figure 5:
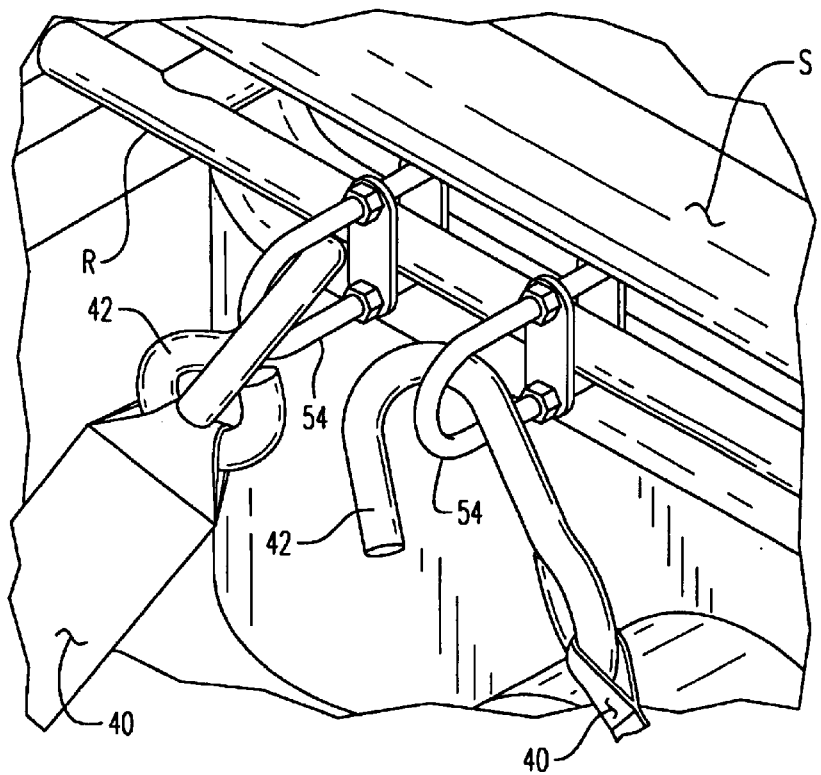
FIG. 5 is a view similar to FIG. 4 showing yet another embodiment of the power wheelchair attachment.

Referring now to FIGS. 3, 4 and 5, alternate attaching arrangements to the attaching member 42 rigidly connected to the power wheelchair PC are there shown. In FIG. 4, a tiedown plate 50 is connected beneath seat S and extends laterally therefrom in either direction as shown. A single enlarged aperture 52 is provided to make the interengagement of the hook ends of the attaching members 42 easier.

In FIG. 5, two separate U-bolts 54 are attached in closely spaced relationship to an existing side rail positioned just beneath the side margin of the seat S. These U-bolts 54 may be spaced apart as desired; however, excessive spacing will reduce the fore and aft component of the tiedown force vector generated within each of the flexible straps 40 and therefore close placement of these tiedowns centrally to the length of the power wheelchair PC as previously described, is preferred.

Figure 6:
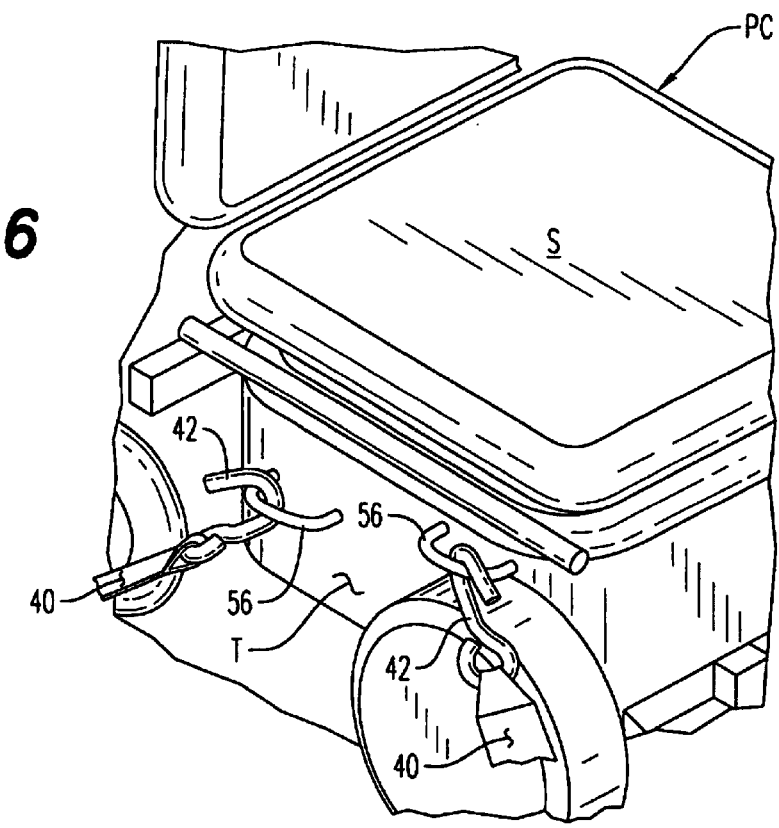
FIG. 6 is a view similar to FIG. 4 showing still another embodiment of the power chair attachment.

Although not preferred, a slightly lowered and more spaced apart pair of attaching loops 56 are shown in FIG. 6. If the manufacturer does not provide such attaching loops 56 for wheelchair tie down purposes in public transportation situations, these U-shaped rod-like loops 56 may be bolted or welded to the side T of the base of the power wheelchair PC as shown.

It should be now understood that, by providing a tiedown structure which exerts relatively uniform restraining force diagonally downward in four directions from essentially two points of attachment just below and central to either side of the seat of the power wheelchair PC, a maximization of the tiedown restraint forces which immobilize the power wheelchair PC atop the platform 12 or 12' is achieved.

The term "substantially flat" as used in this disclosure is intended to also include a power wheelchair receiving and supporting platform formed of two spaced apart parallel channels having co-planar central portions as well as a one-piece platform in which small wheel aligning depressions are formed. So long as no substantial lateral or rolling restraints are functionally included with the platform, it is viewed as being within the intended scope of this aspect of the invention.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A universal power wheelchair lift and restraint system for attachment to a rear of a vehicle comprising:
   a lift platform having a substantially rectangularly shaped, flat, uninterrupted, unobstructed support surface sized to supportively receive a power wheelchair thereon;
   a power lift mechanism attachable to the rear of the vehicle and supportively connected to said platform for elevating and lowering said platform with the power wheelchair positioned atop said platform;

a locking tiedown pivotally connected at each corner of said platform, about a transverse axis adjacent to each end thereof, each said tiedown including an elongated strap extendable from a rolled configuration and having an attaching member securely disposed at a distal end thereof;

attaching member engaging structure connectable to the power wheelchair in close proximity to each side of a seat of the power wheelchair and configured to be securely connected to said attaching members on each corresponding side of the power wheelchair whereby, when said straps are evenly tensioned and locked, the power wheelchair is immobilized atop said platform.

2. A universal power wheelchair lift and restraint system for attachment to a rear of a vehicle consisting of:

a lift platform having a substantially rectangularly shaped, flat, uninterrupted, unobstructed support surface sized to supportively receive a power wheelchair thereon;

a power lift mechanism attachable to the rear of the vehicle and supportively connected to said platform for elevating and lowering said platform with the power wheelchair positioned atop said platform;

a locking tiedown pivotally connected at each corner of said platform about a transverse axis adjacent to each end thereof, each said tiedown including an elongated strap extendable from a rolled configuration and having an attaching member securely disposed at a distal end thereof;

attaching member engaging structure connectable to the power wheelchair in close proximity to each side of a seat of the power wheelchair and configured to be securely connected to said attaching members on each corresponding side of the power wheelchair whereby, when said straps are evenly tensioned and locked, the power wheelchair is immobilized atop said platform.

* * * * *